UNITED STATES PATENT OFFICE.

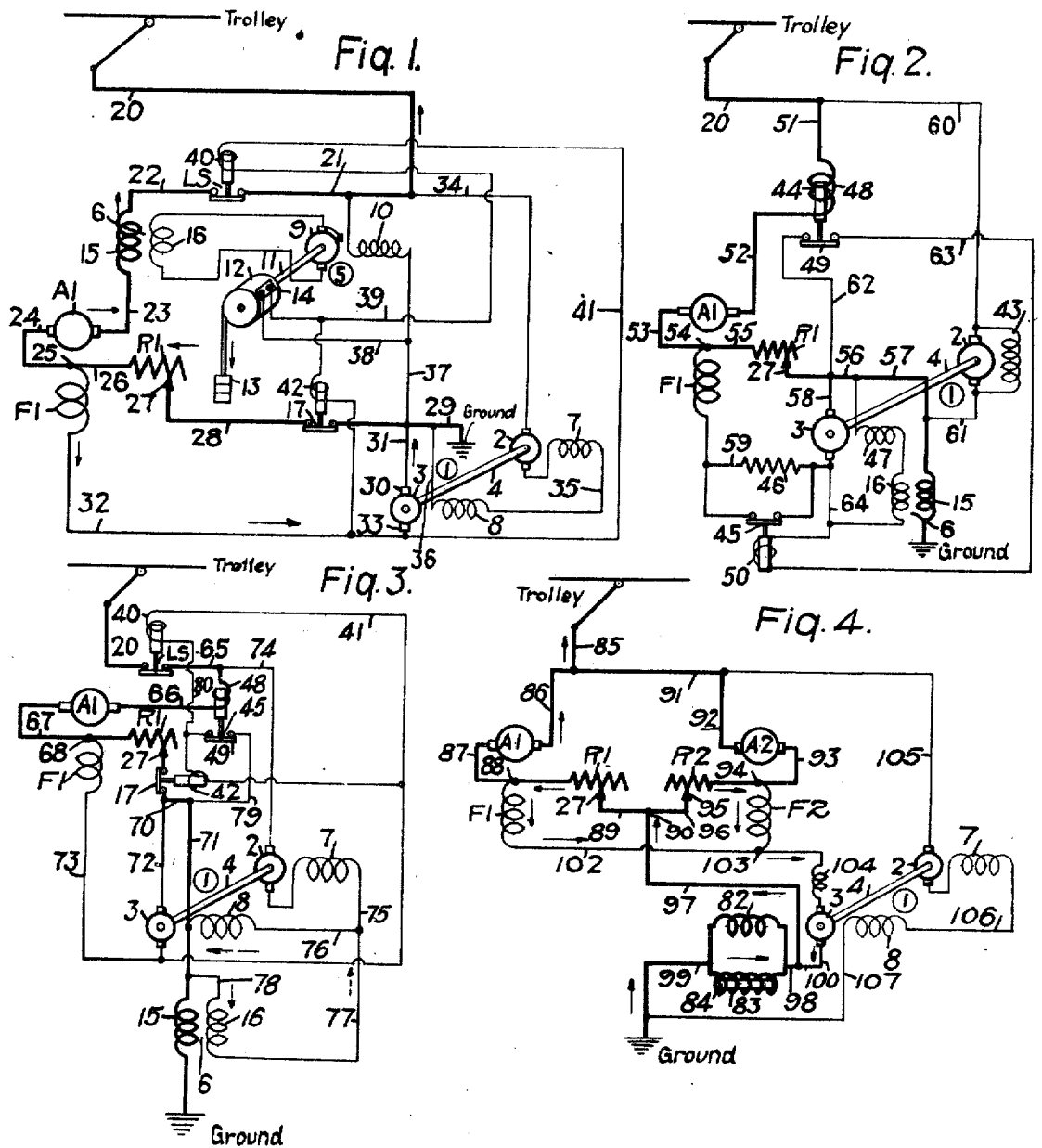

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,318,753.   Specification of Letters Patent.   Patented Oct. 14, 1919.

Application filed September 13, 1916. Serial No. 119,867.

*To all whom it may concern:*

Be it known that I, RUDOLF E. HELLMUND, subject of the German Emperor, and a resident of Swissvale, in the county of Allegheny and State of Pennsylvania, have invented a new and useful Improvement in Systems of Control, of which the following is a specification.

My invention relates to systems of control for electric-railway motors and the like and especially to the automatic control of motors of the direct-current type during regenerative operation.

In my co-pending application, Serial No. 44,443, filed August 9, 1915, is shown a regenerative-control system of the above-mentioned character wherein an auxiliary source of energy, such as a dynamotor or a motor-generator set, is employed for exciting the field windings of the momentum-driven machines, the arrangement of parts being such that an inherent and automatic decrease of regenerative voltage is effected upon an incipient increase of the main current, whereby a desirable negative compounding effect is provided in the system, and a relatively stable system of regeneration obtains.

However, under certain emergency conditions, such as the interruption of supply-circuit voltage by reason of the trolley leaving the supply-circuit conductor or passing a section break, it has been found that the regenerated voltage instantaneously rises to a relatively high value because of the above-mentioned inherent regulating features of the system. Inasmuch as the exciting dynamotor or motor-generator set is connected in parallel relation to the main machines, it follows that such rise of voltage tends to effect an increase in the speed of the auxiliary machines which, in turn, causes an increase of the main field-winding excitation and the regenerated voltage, and thus, the cycle continues until "flash-over" conditions are obtained in the motor of the motor-generator set or in the dynamotor in the course of a second or so.

The object of my present invention is to provide a relatively simple and effective means for obviating the above-mentioned difficulties, said means, in general, being adapted to utilize the inductive effect of the main-circuit increase upon an interruption of supply-circuit voltage, for the final purpose of decreasing the main field-winding excitation, whereby "flash-over" conditions are prevented.

My invention may best be understood by reference to the accompanying drawings in which several systems for automatically accomplishing the intended result in various ways are shown. Figure 1 is a diagrammatic view of a system of control arranged in accordance with my present invention; and Figs. 2, 3 and 4 are similar views of modifications of the system shown in Fig. 1.

Referring to Fig. 1 of the drawing, the system shown comprises suitable supply-circuit conductors respectively marked "Trolley" and "Ground"; a main dynamo-electric machine that is adapted for regenerative operation and comprises an armature A1 and a field winding F1 of the series type; a variable armature-circuit resistor R1; an auxiliary source of energy, such as a motor-generator set or a dynamotor having a pair of armature windings 2 and 3 that are mechanically connected in any suitable manner, as by a shaft 4; a relay device 5 of the motor type for governing purposes to be set forth; a transformer 6 that is adapted to be energized in accordance with the main-circuit current; and a line switch LS and a second switch 17 for connecting the system to the respective supply-circuit conductors, said switches being governed by the relay device 5 and the transformer 6, under predetermined conditions to be described.

The driving armature winding 2 of the motor-generator set 1 is provided with a series-related field winding 7, while a field winding 8 for the driven or generating auxiliary armature winding 3 is connected in series relation with the driving armature and its field winding, as traced in detail later.

The relay device 5 may be of any familiar construction wherein an electric motor exerts torque in opposition to some fixed biasing means, such as a spring or weight. The device shown comprises an armature winding 9 that is adapted to be energized from the transformer 6 as hereinafter described; and a field winding 10 that is connected across the supply circuit. The armature 9 may be mechanically connected, through a shaft 11 or otherwise to a drum 12 or other similar member, the entire rotatable body being biased to a certain position by reason of the action of a weight 13, which works in opposition to the normally developed torque of the armature winding 9, as indicated by the corresponding arrows. In the normal position in question, a contact segment 14 of the drum 12 is adapted to bridge a pair of stationary contact members that are included in the energizing circuit for the actuating coil of the switches LS and 17, as traced in detail later.

The transformer 6 comprises a primary winding 15 that is connected in series-circuit relation with the armature A1, and a secondary winding 16 that is directly connected across the terminals of the relay armature winding 9.

The magnetizable core member (not shown) of the transformer 6 is adapted to become relatively highly saturated when a comparatively low value of regenerated current is flowing. Consequently, it will be understood, that, under normal, that is, relatively small, variations of regenerated current or voltage, the induced electromotive force in the secondary transformer winding 16 is comparatively slight, but that, under the above-mentioned emergency conditions of an interruption of supply-circuit voltage, the resultant sudden and material temporary decrease of main-circuit current causes an appreciable electro-motive force to be induced in the secondary transformer winding 16, whereby the relay armature 9 is sufficiently energized to overcome the opposition of the weight 13 and thus actuate the drum 12 to a position wherein the contact segment 14 thereof becomes disengaged from the corresponding stationary contact members to thus effect the opening of the line switch LS and also that of the switch 17.

Inasmuch as the particular system of main-circuit connections, other than that it possesses the inherent tendency to undesirably increase the regenerated voltage under conditions of supply-circuit voltage interruption, is immaterial to my present invention, I have not deemed it necessary to set forth, in detail, a complete system for effecting the illustrated circuit connections or for inaugurating regenerative operation. It will be understood that any suitable and well-known system for accomplishing such results may be utilized, and the illustrated systems will be described only in so far as is necessary to a thorough understanding of the present invention.

Assuming that regenerative operation has been begun, with the circuit connections established as illustrated, the main circuit may be traced as follows: from the trolley through conductors 20 and 21, the line switch LS, in its closed position, conductor 22, primary winding 15 of the transformer 6, conductor 23, main armature A1, conductor 24, junction-point 25, conductor 26, main-circuit resistor R1, a switching device 27, which may be of any familiar type but which is here conventionally shown as an arrow-head, conductor 28, closed switch 17, and conductor 29 to the negative supply-circuit conductor Ground.

The main field-winding excitation circuit is established from the positive terminal 30 of the auxiliary generating armature 3 through conductor 31, switch 17, conductor 28, switching device 27, main-circuit resistor R1, conductor 26, junction-point 25, main field winding F1, and conductor 32 to the negative terminal 33 of the armature winding 3.

An auxiliary circuit is completed from the positively energized conductor 20 through conductor 34, auxiliary driving armature winding 2, field winding 7 therefor conductor 35, field winding 8 for the auxiliary generating armature 3, and conductors 36 and 29 to ground. The generator armature winding 3 is thus always initially energized in the proper direction by reason of the traversal of the auxiliary driving-motor current through the field winding 8.

The governing circuit for the line switch LS is completed from the positively energized conductor 31, which is directly connected to the auxiliary generating armature 3, through conductors 37 and 38, the contact segment 14 of the relay device 5 in its normal or operative position, conductor 39, the actuating coil 40 for the line switch and conductor 41 to the negative terminal 33 of the auxiliary generating armature 3. It will be understood that an auxiliary source of energy other than the armature winding 3 may be utilized for energizing the actuating coil for the line switch, if desired.

The actuating coil 42 for the switch 17 is connected, in parallel relation, to the line-switch actuating coil and thus is also governed by the contact segment 14 of the relay device 5.

As stated above, during normal or relatively small variations of regenerative conditions, the relay device 5 remains in the illustrated position, since a relatively small torque is created in the armature winding 9. However, upon the interruption of supply-circuit voltage and the consequent instantaneous substantial cessation of regenerated current, the relatively rapid changes of flux conditions in the transformer primary winding 15 causes a correspondingly large value of electromotive force to be induced in the secondary transformer winding 16, in accordance with familiar principles, whereby the previously mentioned action of the armature winding 9 to overcome the opposing action of the weight 13 occurs, with the resultant opening of the energizing circuit for the actuating coils of the line switch LS and of the switch 17 at the contact segment 14 of the drum 12.

Thus, the connection between the supply circuit and the momentum-driven machine is interrupted before the occurrence of the previously-described, undesirably-high-voltage conditions in the system. It will be understood that, in lieu of opening the illustrated switches, which have been kept small in number for the sake of simplicity and clearness, any desired number of switches may be controlled from the same relay device 5, in a manner similar to that shown, for opening up any other desired circuits.

It will be observed that the opening of the line switch LS disconnects the auxiliary motor armature 2 from the main machine but not from the trolley. Thus, upon an interruption of supply-circuit voltage, the generated voltage of the main-machine is also removed from the auxiliary armatures, which is preferable though not necessary: in Fig. 3, for example, the line switch is so located that the opening thereof disconnects the main machine and the auxiliary motor armature from the supply circuit but not from each other.

Referring now to Fig. 2, the system shown comprises the supply-circuit conductors, the main dynamo-electric machine, the main-circuit resistor R1, the transformer 6, and the auxiliary armature windings of the motor-generator set 1, as illustrated in Fig. 1, and, in addition, a low-current relay device 44 of the solenoid type for governing a switch 45 to remove the short-circuit from a main field-winding-circuit resistor 46, under predetermined conditions, is provided, and shunt field windings 43 and 47 are adapted to energize the respective auxiliary armature windings 2 and 3 in lieu of the previously set forth field windings 7 and 8.

In the system being discussed, the primary winding 15 of the transformer 6 is connected in the ground lead of the system, while the secondary winding 16 is connected in series relation with the shunt field winding 47 across the terminals of the auxiliary generator armature winding 3.

The relay device 44 is provided with an actuating coil 48 that is connected in series-circuit relation with the main armature A1, and with a plurality of auxiliary contact members 49 that are connected in circuit with the actuating coil 50 of the switch 45 when the relay device 44 occupies its upper or energized position.

Assuming that regenerative operation has been inaugurated in any suitable manner, the illustrated main circuit connections may be traced as follows: from the trolley through conductors 20, conductor 51, actuating coil 48 for the relay device 44, conductor 52, main armature A1, conductor 53, junction-point 54, conductor 55, main-circuit resistor R1, switching device 27, conductors 56 and 57 and the primary winding 15 of the transformer 6 to the negative conductor Ground.

The main field-winding circuit is completed from one terminal of the auxiliary generating armature 3 through conductor 58, switching device 27, main-circuit resistor R1, conductor 55, junction-point 54, main field winding F1, conductor 59 and normally short-circuited resistor 46 to the opposite terminal of the auxiliary armature 3.

A further circuit is completed from the positively energized conductor 20, through conductor 60, the parallel-related auxiliary motor armature winding 2 and shunt field winding 43, conductor 61, and the primary transformer winding 15 to ground.

The energizing circuit for the switch 45 is established from one terminal of the auxiliary generating armature 3 through conductors 58 and 62, auxiliary contact members 49 of the relay device 44 in its upper position, conductor 63, the actuating coil 50 of the switch and conductor 64 to the opposite terminal of the auxiliary armature 3.

In the present system also, during normal regenerative conditions, by reason of the highly saturated condition of the transformer core member, the effect of the secondary transformer winding 16 is insignificant and becomes effective only under the above-mentioned emergency conditions of an interruption of supply-circuit voltage, with the resultant instantaneous cessation or material decrease of regenerated current.

In such circumstances, the appreciable voltage induced in the secondary transformer winding 16 opposes the voltage of the generating armature 3, whereby the excitation of the shunt field winding 47 therefor, which is connected in series relation with the transformer secondary winding 16, is correspondingly reduced to accordingly decrease the voltage of the auxiliary armature 3 and of the main field winding F1 in a very short interval of time. Thus, the voltage of the regenerative system will be prevented from suddenly rising to a dangerous value. Sebsequently, that is, as soon as the temporary effect of the transformer has diappeared, the regenerated voltage will tend to again rise, but, in the meantime, a sufficient interval has been obtained to insure that the low-current relay device 44 has dropped to its lower position, whereby the switch 45 is opened to insert the resistor 46 in circuit with the main field winding F1 and thus further reduce the voltage available for delivery thereto. Also, switches corresponding to the switches LS and 17 of Fig. 1 and any other selected switches may be opened, as will be understood, provided that such operation is desired, although the resistor 46 may be chosen of a value sufficient to prevent the previously-mentioned dangerous voltage rises at all times, and then the switches in question need not be opened.

The opening of the relay device 45 may be readily adapted to perform another function, if so desired. Assume, for example, a fully automatic auxiliary governing system of a familiar type, wherein a plurality of switches or the contact members of an equivalent drum controller are employed to vary the main-machine-circuit connections or conditions, in accordance with the action of the well-known limit switch, as fully set forth in my co-pending application, Serial No. 122,373, filed September 27, 1916. In such a case, the opening of the relay device 45 may be utilized to interrupt auxiliary circuits to arrest the normal operation of the system; that is, to render the limit switch temporarily inoperative. Furthermore, as also set forth in the co-pending application in question, a time-limit relay device of any familiar type may be employed to open the machine circuits if the period of supply-circuit-voltage interruption approaches a value where a sudden resumption of the voltage might cause injury to the system.

The system of Fig. 3 differs from that shown in Fig. 2 only in that the shunt field windings 43 and 47 for the auxiliary armatures 2 and 3, respectively, have been replaced by the previously-described field windings 7 and 8, and, in addition, the secondary transformer winding 16 is connected in parallel relation to the field winding 8 for the armature 3.

Under the assumed normal regenerative conditions, the main circuit of the system under consideration is completed from the trolley through conductor 20, the closed line switch LS, conductor 65, actuating coil 48 for the relay device 45, conductor 66, main armature A1, conductor 67, junction point 68, main-circuit resistor R1, switching device 27, switch 17, conductors 70 and 71 and the primary transformer winding 15 to the negative supply-circuit conductor Ground.

The main field-winding circuit is established from one terminal of the auxiliary generating armature 3 through conductor 72, switch 17, switching device 27, main-circuit resistor R1, junction-point 68, main field winding F1 and conductor 73 to the opposite terminal of the auxiliary armature 3.

A further circuit is completed from the positively-energized conductor 65, through conductor 74, the auxiliary driving armature 2, field winding 7 therefor and conductor 75, where the circuit divides, one branch including conductor 76 and the field winding 8 for the auxiliary generator armature 3 and the other branch including conductor 77, the secondary transformer winding 16 and conductor 78, whence the circuit is completed through the primary transformer winding 15 to ground.

The energizing circuit for the actuating coil of the line switch LS is established from one terminal of the auxiliary generating armature 3 through conductors 72, 70 and 79, auxiliary contact members 49 of the relay device 45, in its upper position, conductor 80, the actuating coil 40 of the line switch and conductor 41 to the opposite terminal of the auxiliary armature 3. The actuating coil 42 of the switch 17 is connected in parallel relation to the line-switch actuating coil 40.

During normal regenerative operation, when relatively small variations of current occur, the secondary transformer winding 16 has a negligible effect upon the field winding 8 for the auxiliary generator armature 3, for reasons previously set forth. However, a certain quantity of current will, of course, be normally diverted through the secondary transformer winding 16, and the field winding 8 should be designed with this matter in view.

Upon interruption of supply-circuit voltage and the consequent instantaneous and material decrease of regenerated current, the inductive effect of such rapid decrease of current will cause the building up of a material voltage in the secondary transformer winding 16, which will act in the same direction as the normal voltage drop across the secondary transformer winding, but, being considerably larger than such normal drop, the induced voltage will tend to drive a current through the field winding 8 for the auxiliary generator armature 3 in the opposite direction to that normally taken, as indicated by the dotted arrows.

Thus, the differential action of the normal and temporary currents in the field winding 8 will cause a corresponding reduction of the effective excitation produced thereby, with the result that the generated voltage of the auxiliary generator armature 3 and the exciting current of the main field winding F1 will be accordingly reduced to prevent the above-mentioned "flash-over" conditions. As previously described in connection with Fig. 2, the relay device 45 will have time to open the desired circuits prior to the cessation of the described effect of the secondary transformer winding 16.

In Fig. 4, the system shown comprises the supply-circuit conductors, the main machine having the armature A1 and field winding F1, and the auxiliary motor-generator set or dynamotor, as previously described in connection with Fig. 1, and, in addition, a second main dynamo-electric machine having an armature A2 and field winding F2, which machine is connected in parallel relation with the other main machine; and a second regenerated-current-excited field winding 82, for the auxiliary generator armature 3, which is adapted to act cumulatively with respect to the allied field winding 8 and which is bridged by an induction coil 83, or similar device, provided with a greater number of turns than the field winding 82, and having a suitable magnetizable core member 84, for the usual purpose of increasing the inductive effect.

As is the case with the previously described transformer 6, the inductive coil 83 is adapted to have a highly saturated core member with a relatively small current traversing the coil.

Assuming that regenerative operation has been begun in any suitable manner, with the various circuit connections as illustrated, the main circuits may be set forth as follows: from the trolley through conductor 85, where the circuit divides, one branch including conductor 86, main armature A1, conductor 87, junction-point 88, main-circuit resistor R1, the switching device 27 and conductor 89 to junction-point 90, and the other branch including conductors 91 and 92, main armature A2, conductor 93, junction-point 94, main-circuit resistor R2, switching device 95, which corresponds to the switching device 27, and conductor 96 to the junction-point 90, whence a common circuit is completed through conductors 97 and 98, the parallel-related auxiliary field winding 82 and induction coil 83, and conductor 99 to ground.

The main field-winding circuits are established from one terminal of the auxiliary generator armature 3, through conductors 100, 98 and 97 to the junction-point 90, where the circuit divides, one branch including conductor 89, switch 27, main-circuit resistor R1, junction-point 88, main field winding F1 and conductor 102 to junction-point 103, and the other branch including conductor 96, switching device 95, main-circuit resistor R2, junction-point 94 and main field winding F2 to the junction-point 103, whence circuit is completed through a compensating or series-related field winding 104 to the opposite terminal of the auxiliary generator armature 3.

An auxiliary circuit is completed from the positively-energized conductor 91 through conductor 105, auxiliary driving armature 2, field winding 7 therefor, conductor 106, field winding 8 for the auxiliary armature 3 and conductor 107 to ground.

The system under consideration, as well as the single-machine systems previously described, is provided with a "negative compound effect" by reason of the peculiar relation of the main-circuit resistors to the remainder of the system; that is, upon an incipient increase of regenerated or main-armature current, the current traversing the corresponding main field winding is automatically and inherently reduced to cause the regenerated current to again assume the normal value, and the opposite action inherently takes place in the event of an incipient decrease of main-armature current. Such a system is fully set forth and claimed in my above-identified co-pending application and, consequently, only a brief exposition thereof will be given at the present time.

It will be observed that the regenerated current of either main armature and the exciting current from the auxiliary generator armature 3 for the corresponding main field winding both traverse the particular main-circuit resistor R1 or R2 in the same direction, as indicated by the arrows. As a result, upon the above-mentioned increase of main armature current, the consequently augmented voltage drop across the resistor R1 or R2 inherently and automatically decreases the value of voltage available for delivery to the corresponding main field winding from the auxiliary generator armature, and thus the desired decrease of main field-winding excitation to cause a corresponding reduction of the main armature current is obtained.

In the present system, such "negative compound" effect is, however, partially compensated for or opposed by the action of the combined field windings 8 and 82 for the auxiliary generator armature 3, since the additive or positively assisting effect of the regenerated-current-excited field winding 82 tends to increase the voltage delivered by the auxiliary armature 3 upon an increase of regenerated current and, conversely, tends to decrease such voltage upon a reduction of main-armature current. It will be understood that the relative values of the above-mentioned negative compound effect and of the partially counteracting effect of the field winding 82 for the auxiliary armature may be chosen to suit the desired operating conditions by suitable design of parts Thus, the negative compound effect in question acts at a relatively rapid rate to prevent material changes of regenerated current during normal operation, whereas, the counteracting effect of the field winding 82 for the auxiliary armature 3 acts at a slower rate by reason of the inherent inductance of the auxiliary field-winding circuit which requires that an appreciable interval of time must ensue before the field winding properly adjusts itself to the new conditions.

During normal regenerative operation, the induction coil 83, by reason of its highly saturated core member 84, will produce but little effect upon the field winding 82 and, in this way, merely acts similarly to a resistor.

However, upon the above-mentioned material decrease of regenerated current by reason of the interruption of supply-circuit voltage, the decrease of flux in the induction coil 83 and the parallel-related field winding 82 will set up counter-electromotive forces in the respective coils, the induction coil 83 having a greater number of turns than the auxiliary field winding 82, whereby the voltage induced in the induction coil overcomes that induced in the field winding and, consequently, either materially reduces the current traversing the field winding or actually reverses it.

Thus, under the emergency conditions in question, the field excitation of the auxiliary armature 3 is reduced to such a degree and in such a time interval that the current traversing the main field winding is sufficiently decreased to prevent the above-mentioned undesirable "flash-over" conditions. Moreover, the combined action of the field winding 82 and the induction coil 83 is practically instantaneous, or, in other words, the usual time element that is involved in the variation of current and flux in the field winding 82 is substantially eliminated.

The series-related field winding 104 for the auxiliary armature winding 3 may be of either the well-known conductive or the inductive type and the effect thereof is to prevent the occurrence of undesirable inductive effects in the circuit of the main field windings, as will be understood.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a supply circuit, and a momentum-driven dynamo-electric machine adapted to be connected to the supply-circuit and having an armature and a field winding, of an auxiliary dynamo-electric machine for energizing said field winding, a transformer having its primary winding connected in circuit with said momentum-driven machine and its secondary winding connected in circuit with said auxiliary machine to oppose the normal effect of a load change upon the system.

2. In a system of control, the combination with a supply circuit, a main dynamo-electric machine adapted to be connected to the supply circuit and having an armature and a field winding, of an auxiliary dynamo-electric machine for energizing said field winding, and inductive means associated with said machines for governing the operation of the auxiliary machine only in case of sudden change of current flow through the main dynamo-electric machine to oppose the normal effect of a load change upon the system.

3. In a system of control, the combination with a dynamo-electric machine having an armature and a field winding, and means for energizing said field winding, of means inductively associated with said dynamo-electric machine for controlling said energizing means only in case of rapid change in the flow of current through the dynamo-electric machine to oppose the normal effect of a load change upon the system.

4. In a system of regenerative control, the combination with a dynamo-electric machine, of means for imparting thereto a "negative compound" characteristic during normal regenerative operation, and means for counteracting said characteristic under predetermined abnormal conditions.

5. In a system of regenerative control, the combination with a supply circuit and a dynamo-electric machine adapted to be connected thereto and having an armature and a field winding, of auxiliary exciting means for said field winding adapted to act in conjunction with the regenerated current to impart a "negative compound" characteristic to the machine during normal regenerative operation, and means operated under conditions of supply-circuit-voltage interruption for nullifying said characteristic to a predetermined degree.

6. In a system of control, the combination with a supply circuit and a dynamo-electric machine adapted for connection thereto, of relatively rapidly-operative means for counteracting machine-load variations, and relatively slowly-operative means for opposing said first means under predetermined conditions.

7. In a system of control, the combination with a supply circuit and a dynamo-electric machine adapted for connection thereto, of main-circuit means for rapidly and inherently counteracting machine-load variations, and relatively slowly-operative means for nullifying the action of said first means to a certain degree under predetermined supply-circuit conditions.

8. In a system of control, the combination with a supply circuit and a dynamo-electric machine adapted for connection thereto and having an armature and a field winding, of auxiliary exciting means for said field winding, a combined armature-circuit and field-winding-circuit resistor for inherently and rapidly counteracting variations of armature current, and means associated with said exciting means for effecting a relatively slowly-operative nullification of the action of said resistor under conditions of supply-circuit-voltage interruption.

9. In a system of control, the combination with a supply circuit and a dynamo-electric machine adapted for connection thereto and having an armature and a field winding, of auxiliary dynamo-electric means for exciting the main field winding and having armature and field windings, means for inherently and rapidly counteracting variations of main armature current, and inductive means associated with certain of said auxiliary field windings for producing a relatively slow counteracting effect upon said first means under conditions of supply-circuit-voltage interruption.

10. In a system of regenerative control, the combination with a supply circuit and a momentum-driven dynamo-electric machine having an armature and a field winding, of a switching device for modifying certain circuit connections, a relay device for governing said switching device, an auxiliary driven generator armature for energizing said field winding and said switching device, a shunt field winding for said auxiliary armature, and a transformer having its primary winding connected in circuit with the main armature and its secondary winding connected in circuit with the auxiliary field winding.

11. In a system of regenerative control, the combination with a supply circuit and a momentum-driven dynamo-electric machine having an armature and a field winding, of a resistor in circuit with said field winding, a switching device for normally short-circuiting said resistor, a relay device for governing said switching device, an auxiliary generating armature for energizing said field winding and said switching device, a field winding for said auxiliary armature, and a transformer having its primary winding connected in circuit with the main armature and its secondary winding connected in circuit with the auxiliary field winding.

12. In a system of control, the combination with a supply circuit and a dynamo-electric machine adapted for connection thereto, of means operated under conditions of supply-circuit voltage interruption by the inductive effect of the current traversing the armature of said machine for modifying the excitation of the field winding of the machine oppositely to the normal effect of a load change.

13. In a system of control, the combination with a supply circuit and a dynamo-electric machine adapted for connection thereto and having an armature and a field winding, of an auxiliary source of energy for sending current through said field winding in the opposite direction from the current traversing said armature winding, and means operated under predetermined supply-circuit-voltage conditions by the inductive effect of the current traversing said armature winding for modifying the energization of said field winding.

14. In a system of control, the combination with a supply circuit and a dynamo-electric machine adapted for connection thereto and having an armature and a field winding, of an auxiliary source of energy for said field winding, and means operated under conditions of supply-circuit-voltage interruption by the inductive effect of the machine armature winding for modifying the energization of said field winding oppositely to the normal effect of a load change.

15. In a system of control, the combination with a supply circuit and a dynamo-electric machine adapted for connection thereto, of transformer means energized in accordance with main-circuit current for modifying the normal machine excitation under conditions of supply-circuit-voltage interruption oppositely to the normal effect of a load change.

16. In a system of regenerative control, the combination with a dynamo-electric machine, of means for imparting thereto a "negative compound" characteristic during normal regenerative operation, and means, operative upon a change of load current flow in a certain direction, for temporarily counteracting said characteristic.

17. In a system of control, the combination with a supply circuit and a dynamo-electric machine, of means, operated under predetermined abnormal supply-circuit conditions by the inductive effect of the current traversing a certain machine winding, for preventing a predetermined rise of machine voltage, and automatic means for subsequently modifying the machine-circuit connections.

In testimony whereof I have hereunto subscribed my name this 1st day of Sept., 1916.

RUDOLF E. HELLMUND.